(12) United States Patent
Bosisio et al.

(10) Patent No.: US 6,854,036 B2
(45) Date of Patent: Feb. 8, 2005

(54) METHOD OF TRANSFERRING DATA IN A PROCESSING SYSTEM

(75) Inventors: Giuseppe Bosisio, Sesto San Giovanni (IT); Daniele Zanzottera, Busto Garolfo (IT)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/961,804

(22) Filed: Sep. 24, 2001

(65) Prior Publication Data

US 2002/0049890 A1 Apr. 25, 2002

(30) Foreign Application Priority Data

Sep. 25, 2000 (EP) .............................................. 00203333

(51) Int. Cl.[7] .............................................. G06F 12/00
(52) U.S. Cl. ...................... 711/147; 711/130; 711/151; 710/109; 710/240; 710/309; 710/316; 710/317
(58) Field of Search .............................. 711/147, 151, 711/130; 710/317, 109, 240, 309, 316

(56) References Cited

U.S. PATENT DOCUMENTS

| 5,603,005 | A | | 2/1997 | Bauman et al. ............ 395/451 |
|---|---|---|---|---|
| 5,859,975 | A | * | 1/1999 | Brewer et al. ............. 709/213 |
| 5,913,044 | A | * | 6/1999 | Tran et al. ................. 710/107 |
| 6,065,077 | A | | 5/2000 | Fu ............................. 710/100 |
| 6,148,305 | A | * | 11/2000 | Ikegaya et al. .......... 707/104.1 |
| 6,247,100 | B1 | * | 6/2001 | Drehmel et al. ............ 711/141 |

FOREIGN PATENT DOCUMENTS

| EP | 580961 A | 2/1994 |
|---|---|---|
| EP | 923032 A | 6/1999 |

* cited by examiner

Primary Examiner—Donald Sparks
Assistant Examiner—Ngoc V Dinh
(74) Attorney, Agent, or Firm—Sofer & Haroun, LLP

(57) ABSTRACT

A method of transferring data in a processing system comprising a shared memory for storing data blocks, a plurality of processors, at least one of the processors having a cache memory for the data blocks, a plurality of data buses to each one at least one processor is connected, cross-bar for selectively connecting the data buses and the shared memory therebetween; the method comprises the steps of requesting the reading of a data block from the shared memory by a requesting processor, if the requested data block is present in modified form in the cache memory of an intervening processor, requesting an access to the corresponding data bus by the intervening processor, granting the access to the intervening processor, and to any other data bus available to the cross-bar, and sending the modified data block onto the data bus corresponding to the intervening processor and then onto the other data buses available.

10 Claims, 5 Drawing Sheets

METHOD OF TRANSFERRING DATA IN A PROCESSING SYSTEM

FIELD OF THE INVENTION

The present invention relates to a method of transferring data in a processing system.

BACKGROUND OF THE INVENTION

Several types of processing systems have been proposed in the last years in order to obtain high performance. A known solution consists in using a multiprocessor system with a shared memory, wherein several processors execute different operations simultaneously. Typically, each processor includes a cache memory, very fast but with a low capacity, wherein some data blocks stored in the relatively slow shared memory are copied, in such a way as to statistically reduce the number of accesses to the shared memory.

A particular kind of multiprocessor system, described for example in EP-A-0608663, is provided with a plurality of data buses (to each one some processors are connected); the data buses and the shared memory are selectively connected in pairs by means of a cross-bar unit, so that a higher transfer rate on the data buses can be obtained. Each transaction executed in the system includes an address-phase (in which a target unit, either a processor or the shared memory, is selected by a requesting unit) and a data-phase (in which a data block is sent to or received from the target unit). The data-phase is synchronous with the corresponding address-phase; for example, when a processor requests the reading of a data block from the shared memory, this data block is provided to the requesting processor during a fixed time interval (with respect to the beginning of the respective address-phase).

To ensure the consistency of the data blocks of the shared memory replicated in the cache memories, the processors continuously observe (by a technique known as "snooping") the transaction requests, to check whether the requested data block is present in their cache memory. If the requested data block is present in the cache memory of a processor in a form which is modified with respect to the (no longer valid) value present in the shared memory, this processor intervenes by supplying the modified data block to the requesting processor. In this case, the cross-bar unit can directly connect the data bus of the intervening processor to the data bus of the requesting processor.

In a different type of multiprocessor system with a cross-bar unit, described for example in EP-A-0923032, the data-phase is distinct and temporally unrelated with the corresponding address-phase, so that the data blocks can be supplied to the requesting processor in any sequence. Each data block is provided with a tag which identifies the requesting processor and the corresponding transaction. In this case, when the intervening processor sends the modified data block to the cross-bar unit, the modified data block must be received and stored into an input buffer. Only when the modified data block is available in the cross-bar unit, the cross-bar unit can request an access to the data bus of the requesting processor, according to the identifying tag associated with the modified data block. As soon as the access is granted, the modified data block is sent onto the data bus of the requesting processor.

This document also proposes to grant the access to the data bus of the requesting processor to the cross-bar unit as soon as it is recognised that the requested data block is present in modified form in the cache memory of another processor. Therefore, when the modified data block is stored into the input buffer of the cross-bar unit, this modified data block can be immediately sent onto the data bus of the requesting processor (without waiting for the cross-bar unit to request and to be granted the access to the data bus). Such feature reduces the duration of the transfer of the modified data block from the intervening processor to the requesting processor.

This solution keeps the data bus of the requesting processor busy until the modified data block is supplied by the intervening processor. Alternatively, the document EP-A-0923032 also proposes to grant-a conditional access to the data bus of the requesting processor to the cross-bar unit. In other words, the cross-bar unit is notified of any different request of access to the data bus of the requesting processor before completion of an intervention transaction; the cross-bar unit can decide then, according to the state of the intervention transaction, whether to maintain or to release the access to the data bus of the requesting processor. However, this structure requires further signals to be exchanged and then the use of more dedicated lines.

SUMMARY OF THE INVENTION

It is an object of the present invention to provide an alternative solution to the above mentioned problems. To achieve this object a method of transferring data as set out in the first claim is proposed.

Briefly, the present invention provides a method of transferring data in a processing system comprising a shared memory for storing data blocks, a plurality of processors, at least one of the processors having a cache memory for the data blocks, a plurality of data buses to each one at least one processor is connected, cross-bar means for selectively connecting the data buses and the shared memory therebetween; the method comprises the steps of requesting the reading of a data block from the shared memory by a requesting processor, if the requested data block is present in modified form in the cache memory of an intervening processor, requesting an access to the corresponding data bus by the intervening processor, granting the access to the intervening processor, granting an access to any other data bus available to the cross-bar means, logically connecting the data bus corresponding to the intervening processor with the other data buses available, and sending the modified data block onto the data bus corresponding to the intervening processor and then onto the other data buses available.

Moreover, the present invention also provides a corresponding processing system, and a cross-bar device and a control device for use in this processing system.

BRIEF DESCRIPTION OF THE DRAWINGS

Further features and the advantages of the method of transferring data according to the present invention will be made clear by the following description of a preferred embodiment thereof, given purely by way of a non-restrictive indication, with reference to the attached figures, in which.

DETAILED DESCRIPTION OF THE PREFERRED EMBODIMENTS

Figure 1:
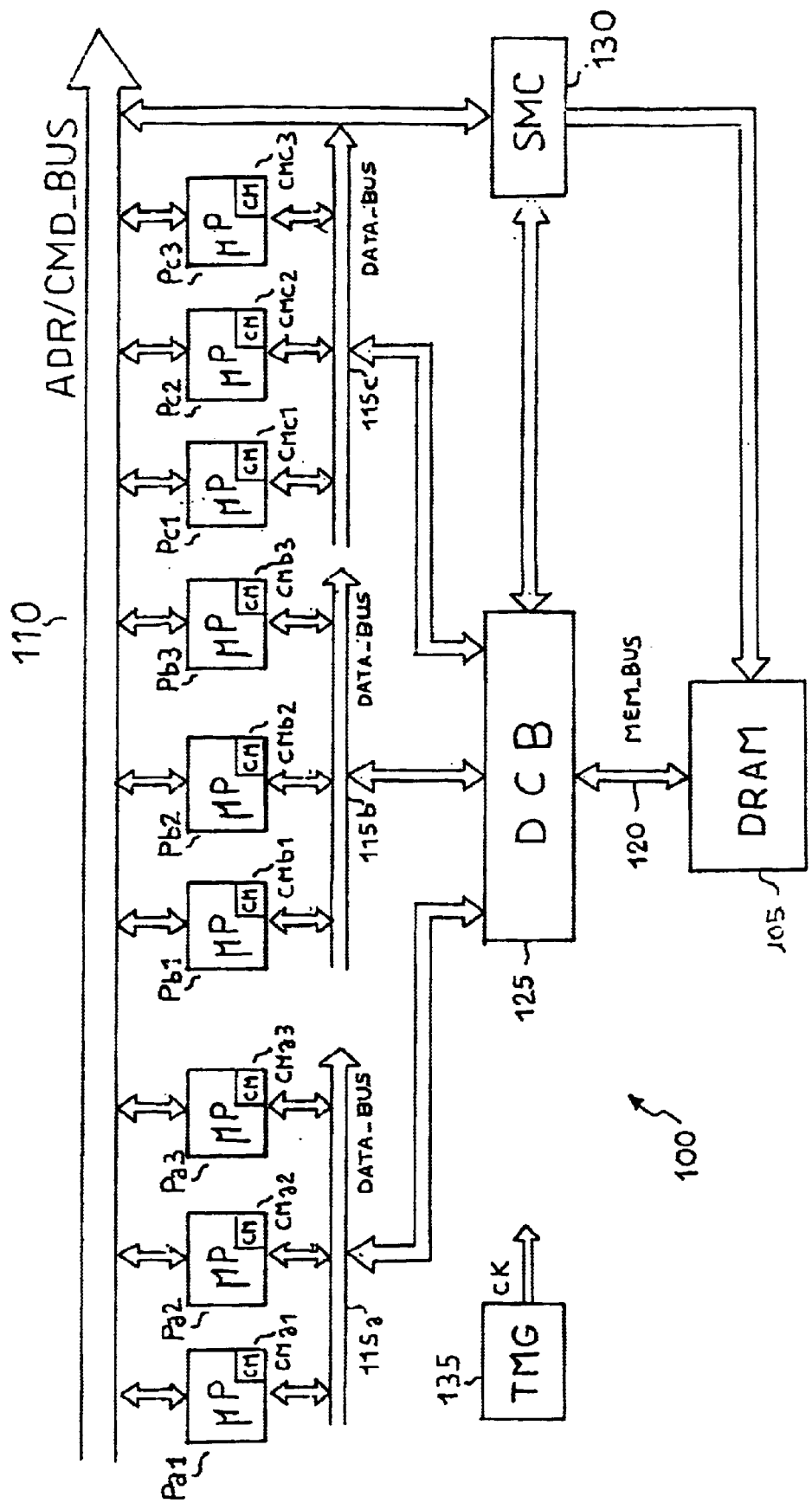
FIG. 1 is a block diagram of a processing system in which the method according to the present invention can be used.

With reference in particular to FIG. 1, a data-processing system 100 with several clusters of processors is shown; for example, a first cluster is formed by three microprocessors (μP) Pa1, Pa2 and Pa3, a second cluster is formed by three microprocessors Pb1, Pb2 and Pb3, and a third cluster is formed by three microprocessors Pc1, Pc2 and Pc3.

The system 100 also includes a shared working memory 105, generally formed by a DRAM (Dynamic Random Access Memory) with several interleaved modules; each location of the shared memory 105 stores a word, consisting for example of 8 bytes (64 bits). The processors Pa1–Pa3, Pb1–Pb3 and Pc1–Pc3 are provided with a respective cache memory CMa1–CMa3, CMb1–CMb3 and CMc1–CMc3, typically constituted by a SRAM (Static Random Access Memory). Each entry of the cache memories CMa1–CMc3 stores a cache line, for example formed by 8 consecutive words of the shared memory 105 (i.e., 64 bytes).

All the processors Pa1–Pc3 are connected to an address and command bus (ADR/CMD_BUS) 110. The processors Pa1–Pa3, Pb1–PB3 and Pc1–Pc3 are connected to a data bus (DATA_BUS) 115a, 115b and 115c, respectively. The shared memory 105 is connected to a memory bus (MEM_BUS) 120. A data cross-bar unit (DCB) 125 selectively connects the data buses 115a–115c and the memory bus 120 therebetween (a plurality of connections can be activated simultaneously without any interference). A system and memory control unit (SMC) 130 is also connected to the address/command bus 110. The unit 130 controls the operation of the cross-bar unit 125 and the operation of the shared memory 105 (and their access to the memory bus 120).

The processors Pa1–Pc3 and the control unit 130 (agents) are connected simultaneously to the address/command bus 110 for receiving the information transmitted along it. Each processor Pa1–Pc3 can operate as a master agent requesting an access to the address/command bus 110 for transmitting information. The respective processors Pa1–Pa3, Pb1–Pb3, Pc1–Pc3 and the cross-bar unit 125 are connected simultaneously to each data bus 115a, 115b, 115c for receiving the information transmitted along them. Each processor Pa1–Pc3 and the cross-bar unit 125 (by means of the control unit 130) can operate as a master agent requesting an access to the respective data bus 115a–115c for transmitting information. The granting of the access with mutual exclusion to the address/command bus 110 and to each data bus 115a–115c is managed by an arbiter provided inside the control unit 130.

Therefore, in any transaction carried out in the system 100, a data-phase is distinct and temporally unrelated with a corresponding address-phase. The information is not controlled in an ordered flow and may be supplied to a requesting processor in any sequence (Out of Order). An identifying tag is combined with each piece of information, in order to associate the piece of information transmitted along the address/command bus 110 or the data buses 115a–115c to the requesting processor and the corresponding transaction.

A timing unit (TMG) 135 generates a clock signal Ck which is supplied to the processors Pa1–Pc3, to the shared memory 105, to the cross-bar unit 125 and to the control unit 130 to synchronise the operation of the system 100.

Likewise considerations apply if the processing system has a different structure, for example some of the processors consist of input/output controllers or bridge units for connection to a local bus, if only one or more of the processors have a cache memory, if each word and each cache line consist of a different number of bits, if a different number of data buses and a different number of processors (down to two data buses, each one with a single processor) are provided, and so on.

Figure 2:
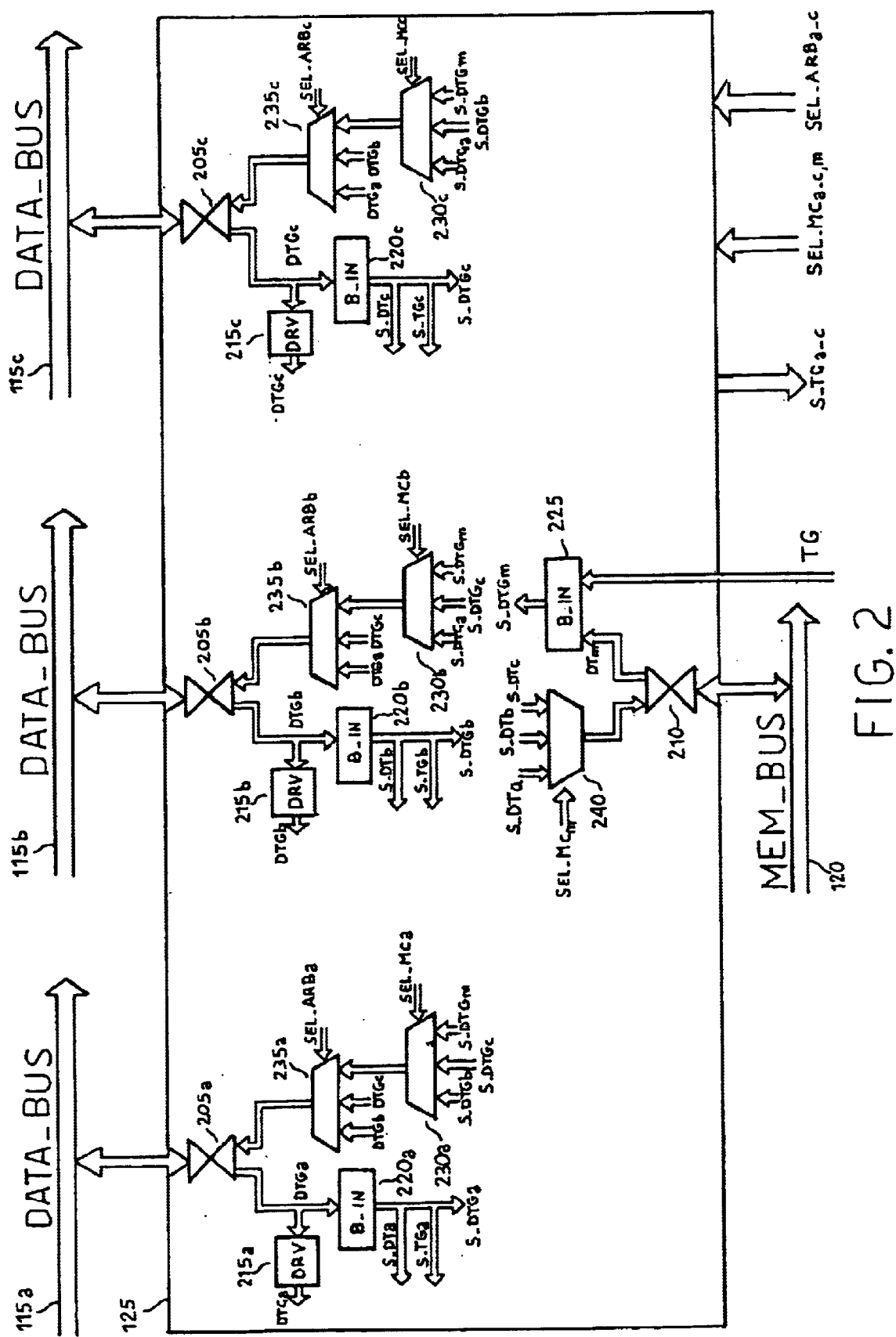
FIGS. 2 and 3 show in schematic form a cross-bar unit and a control unit, respectively, of the processing system.

With reference to FIG. 2, the cross-bar unit 125 includes, for each data bus 115$i$ (with i=a . . . c), a respective transceiver 205$i$. Data blocks, each one consisting of a cache line and a corresponding identifying tag, are transmitted along the data buses 115a–c. Each data bus 115$i$ has a capacity of 8 bytes, for example. Therefore, the transfer of each data block along the data buses 115a–c takes place by serialisation of the operation into successive steps; particularly, the cache line is split into 8 beats (each consisting of 8 bytes), which are transmitted in sequence. A data block DTG$_i$ (formed by a cache line DT$_i$ and an identifying tag TG$_i$) is received from the data bus 115$i$ by the transceiver 205$i$, and is stored into a respective input buffer (B_IN) 220$i$; the data block DTG$_i$ is also received by a respective driver (DRV) 215$i$, operating as an impedance separator and a signal generator, which transmits the received data block DTG$_i$ with a delay of one clock period.

A further transceiver 210 is connected to the memory bus 120. Cache lines are transmitted along the memory bus 120. The memory bus 120 has a capacity of 32 bytes, for example; therefore, the transfer of each cache line along the memory bus 120 takes place in two successive steps, during each one 32 bytes are transferred. A cache line DT$_m$ is received from the memory bus 120 by the transceiver 210, and is stored into a further input buffer (B_IN) 225; the input buffer 225 also stores a corresponding identifying tag TG supplied by the control unit.

Two multiplexers 230$i$ and 235$i$ are associated with each data bus 115$i$. The multiplexer 230$i$ has three inputs which receive the data blocks stored in the input buffers corresponding to the other data buses (signals S_DTG$_a$, S_DTG$_b$ and S_DTG$_c$) and in the input buffer corresponding to the memory bus (signal S_DTG$_m$), respectively; for example, the multiplexer 230$a$ (likewise considerations apply to the multiplexers 230$b$,230$c$) receives the data block S_DTG$_b$ (stored in the input buffer 220$b$), the data block S_DTG$_c$ (stored in the input buffer 220$c$), and the data block S_DTG$_m$ (stored in the input buffer 225). The multiplexer 235$i$ has three inputs which receive the data blocks transmitted by the drivers associated with the other data buses and by the multiplexer 230$i$, respectively; for example, the multiplexer 235$a$ (likewise considerations apply to the multiplexers 235$b$,235$c$) receives the data block DTG$_b$ (transmitted by the driver 215$b$), the data block DTG$_c$ (transmitted by the driver 215$c$), and the data block (S_DTG$_b$, S_DTG$_c$ or S_DTG$_m$) transmitted by the multiplexer 230$i$. An output of the multiplexer 235$i$ is connected to the transceiver 205$i$, for sending the data block transmitted by the multiplexer 235$i$ onto the data bus 115$i$.

A further multiplexer 240 has three inputs which receive the cache line S_DT$_a$ (stored in the input buffer 220$a$) the cache line S_DT$_b$ (stored in the input buffer 220$b$), and the cache line S_DT$_c$ (stored in the input buffer 220$c$), respectively. An output of the multiplexer 240 is connected to the transceiver 210, for sending the cache line transmitted by the multiplexer 240 onto the memory bus 120.

The multiplexer 230$i$ is controlled by a signal SEL_MC$_i$, the multiplexer 235$i$ is controlled by a signal SEL_ARB$_i$, and the multiplexer 240 is controlled by a signal SEL_MC$_m$. The control signals SEL_MC$_{a-c,m}$ and the control signals SEL_ARB$_{a-c}$ are supplied by the control unit; conversely, the tags S_TG$_{a-c}$ stored in the input buffers 220$a$–$c$ are provided to the control unit.

Figure 3:
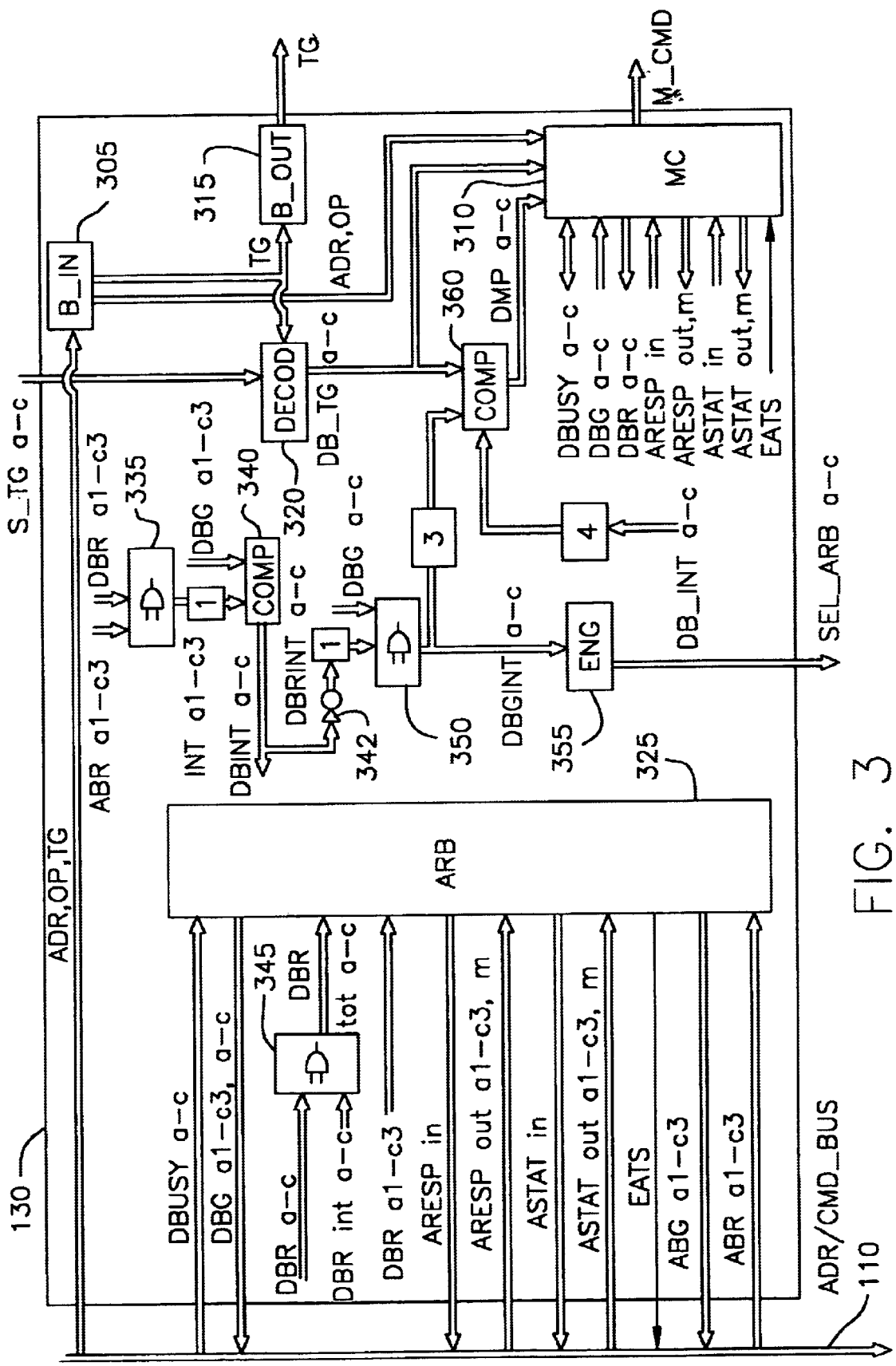

Considering now FIG. 3, a value ADR indicative of an address of a cache line, a value OP indicative of the type of operation requested (e.g., reading, writing, reading with intention to modify) and the identifying tag TG are transmitted along the address/command bus 110. The values ADR,OP,TG received from the address/command bus 110 are stored into an input buffer (B_IN) 305.

The address ADR and the operation signal OP (stored in the input buffer 305) are supplied to a memory controller (MC) 310. The memory controller 310 outputs a series of signals, denoted as a whole with M_CMD, which controls a reading or a writing operation (according to the operation signal OP) for a location of a block of the shared memory (according to the address ADR) and enables sending the cache line read from the shared memory onto the memory bus.

The identifying tag TG (stored in the input buffer 305) is provided to an output buffer (B_OUT) 315 and to a decoder (DECOD) 320. The output buffer 315 is used to store the identifying tag TG for sending to the cross-bar unit when the corresponding data block has been read from the shared memory. The decoder 320 also receives the identifying tags $S\_TG_{a-c}$ stored in the input buffers of the cross-bar unit. The decoder 320 outputs, for each data bus, a signal $DB\_TG_i$ which is asserted when the processor identified by the tag (TG or $S\_TG_{a-c}$) is connected to the data bus; the data bus identifiers $DB\_TG_{a-c}$ are supplied to the memory controller 310.

The control unit 130 includes an arbiter (ARB) 325 for the address/command bus 110 and each data bus. All the processors are connected to the arbiter 325 through a respective dedicated point-to-point line for sending a signal $ABR_j$ (with j=a1 ... c3) requesting an access to the address/command bus 110, and through a further respective dedicated line for receiving a signal $ABG_j$ granting the access to the address/command bus 110. The arbiter 325 is connected through a multi-point line to all the processors and to the memory controller 310 for sending a signal EATS indicating the validity of the information present on the address/command bus 110; the occupation of the address/command bus 110 has a fixed duration (of 3 clock periods, for example).

All the processors and the memory controller 310 are connected through respective dedicated lines (e.g., two lines) to the arbiter 325 for sending a signal indicating the state of a current transaction associated with the values ADR,OP,TG sent onto the address/command bus 110; particularly, each processor supplies a state signal $AStatOut_j$ and the memory controller 310 supplies a state signal $AStatOut_m$. The arbiter 325 is connected through multi-point lines (two lines in the example at issue) to all the processors and to the memory controller 310 for sending a signal AStatIn indicating the collective state of the current transaction, according to the value of the state signals $AStatOut_{a1-c3,m}$.

Likewise, all the processors and the memory controller 310 are connected through respective dedicated lines (e.g., three lines) to the arbiter 325 for sending a signal indicating the state of a snooping process for the current transaction; particularly, each processor supplies a snooping signal $ARespOut_j$ and the memory controller 310 supplies a snooping signal $ARespOut_m$. The arbiter 325 is connected through multi-point lines (three lines in the example at issue) to all the processors and to the memory controller 310 for sending a signal ARespIn indicating the collective state of the snooping, according to the value of the snooping signals $ARespOut_{a1-c3,m}$.

Each processor is connected to the arbiter 325 through a dedicated point-to-point line for sending a signal $DBR_j$ requesting an access to the associated data bus. The memory controller 310 provides, for each data bus, a signal $DBR_i$ requesting a further access to the data bus. Each processor and the memory controller 310 are connected to the arbiter 325 through respective dedicated lines for receiving a signal granting access to the corresponding data bus. Particularly, each processor receives a grant signal $DBG_j$ and the memory controller 310 receives a grant signal $DBG_i$ for each data bus.

A dedicated line for each data bus is used to transmit a signal $Dbusy_i$ indicating the occupation of the respective data bus; each processor is connected to the corresponding line, while the memory controller 310 is connected to all the lines. The occupation signal $DBusy_i$ is sent along the corresponding line by the agent (processor or memory controller) which has obtained access to the respective data bus and is received simultaneously by the other agents and by the arbiter 325. The duration of the data bus occupation is variable as a function of the length of the data block transmitted; in the example at issue, wherein the cache line consists of 64 bytes and each data bus has a capacity of 8 bytes, the transfer of a cache line requires 8 clock periods.

The request signals $ABR_{a1-c3}$ and the request signals $DBR_{a1-c3}$ are supplied to respective inputs of an AND block 335. The AND block 335 outputs, for each processor, a signal $INT_j$ indicating that the processor has only required the access to the associated data bus (and not to the address/command bus 110 simultaneously), in order to carry out an intervention transaction. The AND block 335 substantially consists of an AND logic gate for each processor; the AND logic gate is supplied with the request signal $DBR_j$ and with the negated request signal $\overline{ADR_j}$, and outputs the intervention request signal $INT_j$.

A comparator block (COMP) 340 receives the intervention request signals $INT_{a1-c3}$ (with a delay of one clock period) and the grant signals $DBG_{a1-c3}$. The comparator block 340 checks whether each intervening processor has been granted the access to the corresponding data bus; when two or more intervening processors are simultaneously granted access to the corresponding data bus, the comparator block 340 selects one of them (for example, according to a round-robin policy). The comparator block 340 then outputs, for each data bus, a signal $DB\_INT_i$ which is asserted when the selected intervening processor is connected to the data bus. The intervention data bus identifiers $DB\_INT_{a-c}$ are supplied to a NOT block 342, which outputs, for each data bus, a signal $DBRint_i$ requesting an additional access to the other data buses by the cross-bar unit.

The request signals $DBR_{a-c}$ and the additional request signals $DBRint_{a-c}$ are supplied to respective inputs of an OR block 345. The OR block 345 outputs, for each data bus, a signal $DBRtot_i$ indicating a total access request to the data bus by the cross-bar unit, which is supplied to the arbiter 325. A further AND block 350 receives the additional request signals $DBRint_{a-c}$ (with a delay of one clock period) and the grant signals $DBG_{a-c}$. The AND block 350 outputs, for each data bus, a signal $DBGint_i$ indicating an additional grant to the respective data bus to the cross-bar unit.

The additional grant signals $DBGint_{a-c}$ are supplied to an encoder (ENC) 355, which outputs the selection signals $SEL\_ARB_{a-c}$ (which are supplied to the cross-bar unit). A further comparator block 360 receives the intervention data bus identifiers $DB\_INT_{a-c}$ (with a delay of four clock periods), the additional grant signals $DBGint_{a-c}$ (with a delay of three clock periods) and the data bus identifiers $DB\_TG_{a-c}$ at respective inputs. The comparator block 360 outputs, for each data bus, a dump signal $DMP_i$, indicating that the data block provided by the corresponding intervening processor has been sent onto the data bus of the requesting processor, so that the data block stored in the input buffer of the cross-bar unit can be discharged. The dump signals $DMP_{a-c}$ are supplied to the memory control 310. Substantially, the comparator block 360 checks whether the cross-bar unit has been granted the additional access to the data bus of the requesting processor; if so, the dump signal $DMP_i$ corresponding to the data bus of the intervening processor is asserted.

Likewise considerations apply if equivalent cross-bar means and control means are provided, for example if the system includes several cross-bar units connected in parallel, if the arbiters consists of a distinct unit, if the cross-bar unit and the control unit are implemented with a single device, if the address/command bus and the data buses have a different protocol, and so on.

Figure 4A:
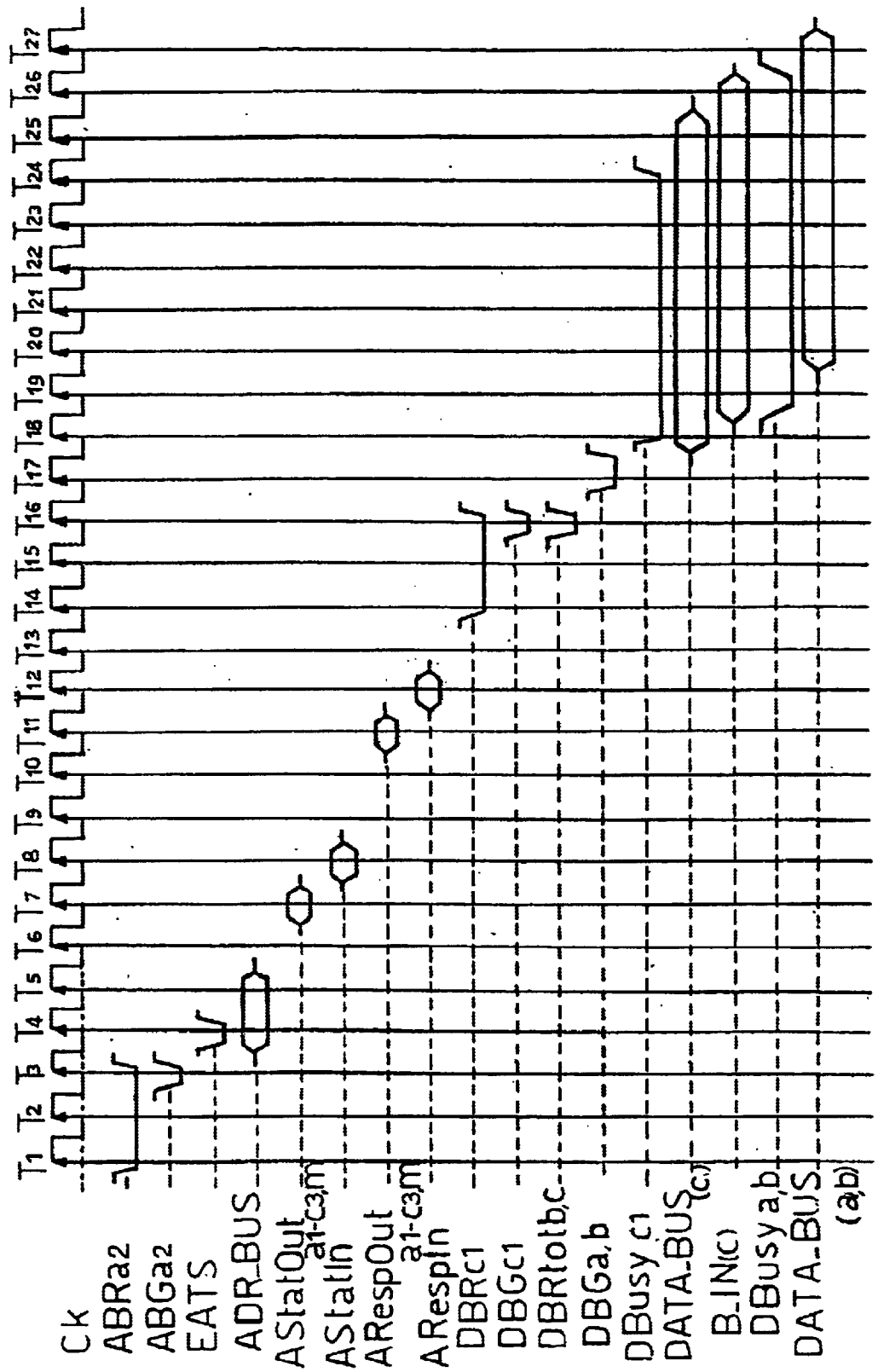
FIGS. 4a and 4b depict timing diagrams of the method of transferring data according to the present invention.

With reference now to FIG. 4a (together with FIGS. 1–3), a timing diagram of a data transfer in the system 100 is described. The various signals are logically asserted at a low level, and are logically deasserted at a high level. The signals are switched at the rising edge of the clock signal; the state of the signals is stable at a next rising edge of the clock signal (after one or more clock periods), so that the signals can be strobed. A bit is represented by a single line, while signals formed by more bits are represented by a band (the crossing points of the band define the switching instants).

When a processor (for example the processor Pa2 connected to the data bus 115a) requests an access to the address/command bus 110 for reading a data block from the shared memory 105, the processor Pa2 asserts the request signal $ABR_{a2}$ at a generic instant T1; the request signal $ABR_{a2}$ is kept asserted up to an instant, for example T3, at which the arbiter 325 grants the access to the address/command bus 110 (by asserting the grant signal $ABG_{a2}$). The arbiter 325 asserts the signal EATS at the instant T4 to signal to all the agents (processors Pa1–Pc3 and memory controller 310) that the information present on the address/command bus 110 at the next instant is valid. Simultaneously, the processor Pa2 accesses the address/command bus 110 by sending along it the address ADR of the requested data block, the operation signal OP (indicating a reading operation), and the corresponding identifying tag TG.

The values ADR,OP,TG present on the address/command bus 110 are received at the instant T5 by all the agents, each of which generates the respective transaction state signal $AStatOut_{a1-c,m}$ at the instant T7 (represented in the figure in cumulative form). At the instant T8, the collective transaction state signal AStatIn is output by the arbiter 325. Each agent then generates at the instant T11 the respective snooping state signal $ARespOut_{a1-c3,m}$ (represented in the figure in cumulative form). At the instant T12, the collective snooping state signal ARespIn is output by the arbiter 325.

If the requested data block is present in the cache memory of a processor (for example the processor Pc1) in modified form (ARespIn=Modify), the processor Pc1 intervenes, as soon as available, for supplying the modified data block to the requesting processor Pa2. For example, at a generic instant T14 (generally following the instant T12) the intervening processor Pc1 asserts the request signal $DBR_{c1}$ (while the request signal $ADR_{c1}$ is kept deasserted). As a consequence, the AND block 335 asserts the intervention signal $INT_{c1}$. The intervention transaction is the only one in which a processor requests the access to the respective data bus and not to the address/command bus. Therefore, assuming that no other processor is requesting the access to the respective data bus for carrying out an intervention transaction, the intervention signals, distinct from the intervention signal $INT_{c1}$, are deasserted.

The arbiter 325 grants the access to the data bus 115c to the intervening processor Pc1 at a subsequent instant, for example T16 (asserting the grant signal $DBG_{c1}$). As a consequence, the comparator block 340 asserts (for a single clock period) the respective intervention data bus identifier $DB\_INT_c$ (while the intervention data bus identifiers $DB\_INT_{a,b}$ are kept deasserted) and then the NOT block 342 asserts the additional request signals for the data buses distinct from the data bus of the intervening processor, i.e. the additional request signals $DBRInt_a$ and $DBRint_b$ (while the additional request signal $DBRInt_c$ is kept deasserted). Therefore, the total request signals $DBRtot_{a,b}$ (output by the OR block 345) are asserted (while the total request signal $DBRtot_c$ is asserted or deasserted according to the value of the request signal $DBR_c$).

The arbiter 325 grants to the cross-bar unit the further access to the data buses available at the next clock period (instant T17). Assuming that the data buses 115a and 115c are both available, the arbiter 325 asserts the grant signals $DBG_{a,b}$; as a consequence, the AND block 350 asserts the additional grant signals $DBGint_a$ and $DBGint_b$.

At the instant T18, the intervening processor Pc1 occupies the data bus 115c (asserting the occupation signal $Dbusy_{c1}$) and sends the modified data block ($DTG_c$) along it; in the example at issue, the transfer operation requires 8 clock periods and therefore the occupation signal $Dbusy_{c1}$ is deasserted after the instant T24 and the transfer of the modified data block $DTG_c$ terminates at the instant T25. The modified data block $DTG_c$ is loaded into the corresponding input buffer 220c of the cross-bar unit 125 after one clock period, in other words from the instant T19 to the instant T26.

In the meanwhile, the memory controller 310 occupies (for the cross-bar unit 125) the data buses 155a and 155b (asserting the occupation signal $DBusy_a$ and the occupation signal $DBusy_b$, respectively) at the instant T19. The modified data block $DTG_c$ (received into the cross-bar unit 125 from the data bus 115c) is also provided to the corresponding driver 215c. Simultaneously, the encoder 355 outputs the corresponding selection signals $SEL\_ARB_{a,b}$; particularly, the selection signal $SEL\_ARB_a$ controls the multiplexer 235a and the selection signal $SEL\_ARB_b$ controls the multiplexer 235b to transfer the data block $DTG_c$ (received from the driver 215c after one clock period, that is starting from the instant T20) to the transceiver 205a and 205b, respectively. Therefore, the modified data block $DTG_c$ is immediately sent onto both the data bus 115a and the data bus 115b. The transfer operation requires 8 clock periods and therefore the occupation signals $DBusy_{a,b}$ are deasserted after the instant T26 and the transfer of the modified data block $DTG_c$ terminates at the instant T27.

Since the cross-bar unit 125 has been granted the additional access to the data bus 115a of the requesting processor Pa2 (additional grant signal $DBGint_a$ and data bus identifier $DB\_TG_a$ both asserted), the dump signal $DMP_c$ (associated with the intervention data bus identifier $DB\_INT_c$) is asserted. As a consequence, the modified data block $S\_DTG_c$ stored in the input buffer 220c is discharged by the memory controller 310 (i.e., it is overwritten by the next data block received from the data bus 115c), as the modified data block $DTG_c$ has already been sent onto the data bus 115a of the requesting processor Pa1.

Figure 4B:
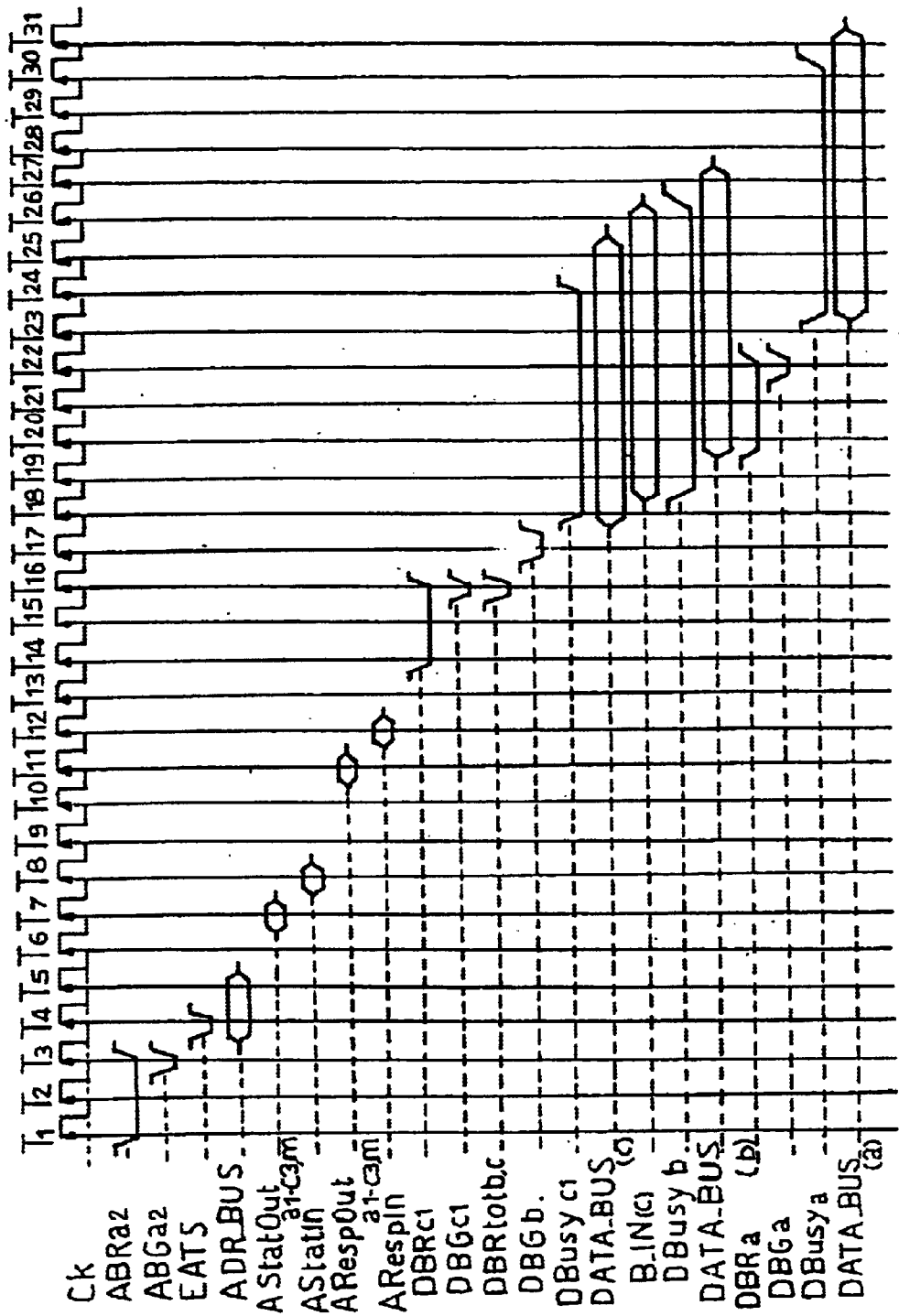

On the other hand, if the data bus 115a of the requesting processor Pa2 is not available at the instant T17, as shown in FIG. 4b, the arbiter 325 grants to the cross-bar unit only the additional access to the data bus 115b (asserting the grant signal DBGb, while the grant signal DBGa is kept deasserted); as a consequence, the AND block 350 asserts only the additional grant signal DBGint$_b$.

As in the case described above, the modified data block DTG$_c$ is sent onto the data bus 115c by the intervening processor Pc1 and it is loaded into the corresponding input buffer 220c of the cross-bar unit 125 after one clock period (from the instant T19 to the instant T26). The modified data block DTG$_c$ is also provided to the corresponding driver block 215c; the selection signal SEL_AR$_b$ controls the multiplexer 235b to transfer the data block DTG$_c$ (received from the driver block 215c after one clock period) to the transceiver 205b and then onto the data bus 115b (from the instant T20 to the instant T27).

Since the cross-bar unit 125 has not been granted the additional access to the data bus 115a of the requesting processor Pa2 (additional grant signal DBGint$_a$ deasserted), the dump signal DMP$_c$ is deasserted. Therefore, the modified data block S_DTG$_c$ stored into the input buffer 220c is subsequently sent onto the data bus 115a of the requesting processor Pa1 in a known manner.

Particularly, once the tag S_TG$_c$ (identifying the data bus 115a of the requesting processor Pa2) is available in the cross-bar unit, it is provided to the decoder 320 of the control unit 130, which asserts the corresponding data bus identifier DB_TG$_a$. As a consequence, the memory controller 310 requests an access to the data bus 115a of the requesting processor Pa2 by asserting the request signal DBR$_a$, for example at the instant T20. The request signal DBR$_a$ is kept asserted up to an instant, for example T22, at which the arbiter 325 grants the access to the data bus 115a (by asserting the grant signal DBR$_a$).

At the instant T24, the memory controller 310 occupies (for the cross-bar unit 125) the data bus 125a (asserting the occupation signal DBusy$_a$) for sending the modified data block S_DTG$_c$ stored in the input buffer 220c. The occupation signal DBusy$_a$ is deasserted after the instant T30 and the transfer of the modified data block S_DTG$_c$ terminates at the instant T31.

Likewise considerations apply if the signals are asserted/deasserted at a high/low level, if different signals are used, if the transfer of any data block is carried out with a different timing, and so on. For example, if the system includes only two data buses, the control unit is simplified, since if the cross-bar unit has been granted the additional access to the other data bus, the modified data block is always transferred to the requesting processor. More generally, the method according to the present invention provides the steps of granting an access to any other data bus available to the cross-bar means, logically connecting the data bus corresponding to the intervening processor with the other data buses available, and sending the modified data block onto the data bus corresponding to the intervening processor and then onto the other data buses available.

The solution of the present invention reduces the duration of the data transfer operation; therefore, the throughput of the system as a whole is increased (particularly in a system with a lot of processors, wherein the intervention transactions are very frequent). More specifically, the data bus of the intervening processor is (logically) short-circuited with any other data bus available; in this way, the modified data block can be directly sent onto the data bus of the requesting processor, without having to store the modified data block into the input buffer of the cross-bar unit before requesting access to the data bus of the requesting processor. This method provides a time saving of the order of 20% over the whole operation of transferring the modified data block from the intervening processor to the requesting processor (for example, 4 clock periods out of 31 clock periods are saved in the intervention transaction described above).

In the method of the invention, the data bus of the requesting processor is not kept busy while waiting for the modified data block to be supplied by the intervening processor. This result is achieved with a very simple structure, which does not require any new signal to be exchanged.

The preferred embodiment of the present invention described above is particularly advantageous, in that each beat of the modified data block is sent onto any data bus available as soon as the beat is received by the cross-bar unit (with a single clock period delay due to the corresponding driver); in this way, each beat is directly sent onto any data bus available before receiving the next beat of the modified data block. Moreover, the structure of the cross-bar unit (comprising only some more multiplexers) is very simple.

However, the present invention lends itself to be implemented even with drivers latching and transmitting each beat with a delay of two or more clock periods, without any driver (with the trade-off of having to reduce the operative frequency of the data buses), with different elements managing the transfer of the data blocks in the cross-bar units, and the like.

Naturally, in order to satisfy local and specific requirements, a person skilled in the art may apply to the method of transferring data described above many modifications and alterations all of which, however, are included within the scope of protection of the invention as defined by the following claims.

That which is claimed is:

1. A method of transferring data in a processing system comprising a shared memory for storing data blocks, a plurality of processors, at least one of the processors having a cache memory for the data blocks, a plurality of data buses to each one at least one processor is connected, cross-bar means for selectively connecting the data buses and the shared memory therebetween, the method comprising the steps of:
   a) requesting the reading of a data block from the shared memory by a requesting processor,
   b) if the requested data block is present in modified form in the cache memory of an intervening processor, requesting an access to the corresponding data bus by the intervening processor,
   c) granting the access to the intervening processor,
   d) granting an access to any other data bus available to the cross-bar means and logically connecting the data bus corresponding to the intervening processor with the other data buses available, at least one of said other data bus corresponds to another processor which has not requested the modified data block and
   e) sending the modified data block onto the data bus corresponding to the intervening processor and then onto the other data buses available.

2. The method according to claim 1, wherein each data block includes a plurality of elements, the step e) including the steps of:
   sending in sequence the elements of the modified data block onto the data bus corresponding to the intervening processor, receiving each element of the modified data block into the cross-bar means, and sending the received element onto the other data buses available before receiving a next element of the modified data block.

3. The method according to claim 1, wherein each data block includes a tag identifying a target processor, the method further comprising the steps of:

storing the modified data block into the cross-bar means and determining the data bus associated with the corresponding identifying tag, and if the data bus associated with the identifying tag of the modified data block is not included in the other data buses available, requesting a further access to the data bus associated with the identifying tag of the modified data block by the cross-bar means, granting the further access to the cross-bar means, and sending the modified data block onto the data bus associated with the corresponding identifying tag.

4. A processing system comprising:

a shared memory for storing data blocks, a plurality of processors, at least one of the processors having a cache memory for the data blocks, a plurality of data buses to each one at least one processor is connected, cross-bar means for selectively connecting the data buses and the shared memory therebetween, control means for the cross-bar means, arbiter means, responsive to a request of an access to the corresponding data bus by an intervening processor having a data block requested by a requesting processor in modified form in the cache memory, for granting the access to the intervening processor, means for granting an access to any other data bus available to the cross-bar means when the access to the corresponding data bus is granted to the intervening processor, the means for granting being included in said control means, means for logically connecting the data bus corresponding to the intervening processor with the other data buses available, the means for logically connecting being included in the cross-bar means and the modified data block being sent onto the data bus corresponding to the intervening processor and then onto the other data buses available, wherein at least one of said other data bus corresponds to another processor which has not requested the modified data block.

5. The processing system according to claim 4, wherein each data block includes a plurality of elements, the elements of the data block being sent in sequence onto each data bus, and wherein the cross-bar means further comprises means for receiving each element of the modified data block and for sending the received element onto the other data buses available before receiving a next element of the modified data block.

6. The processing system according to claim 4, wherein each data block includes a tag identifying a target processor, wherein the cross-bar means further includes, for each data bus, a buffer for storing the data block received from the data bus, and wherein the control means further includes means for determining the data bus associated with the identifying tag of the modified data block stored in the buffer and means for discharging the modified data block stored in the buffer if the data bus associated with the corresponding identifying tag is included in the other data buses available.

7. The processing system according to claim 6, wherein the cross-bar means further includes multiplexing means, each data bus and the corresponding buffer being selectively connected to the other data buses through the multiplexing means.

8. The processing system according to claim 7, wherein each data bus is connected to the other data buses through a driver.

9. A cross-bar device for use in the processing system of claim 4, the cross-bar device including said cross-bar means.

10. A control device for use in the processing system of claim 4, the control device including said control means.

* * * * *